June 29, 1965     L. F. BENDER     3,191,576
MILK LINE RELEASER AND WASHER APPARATUS
Filed Jan. 16, 1964     3 Sheets-Sheet 1
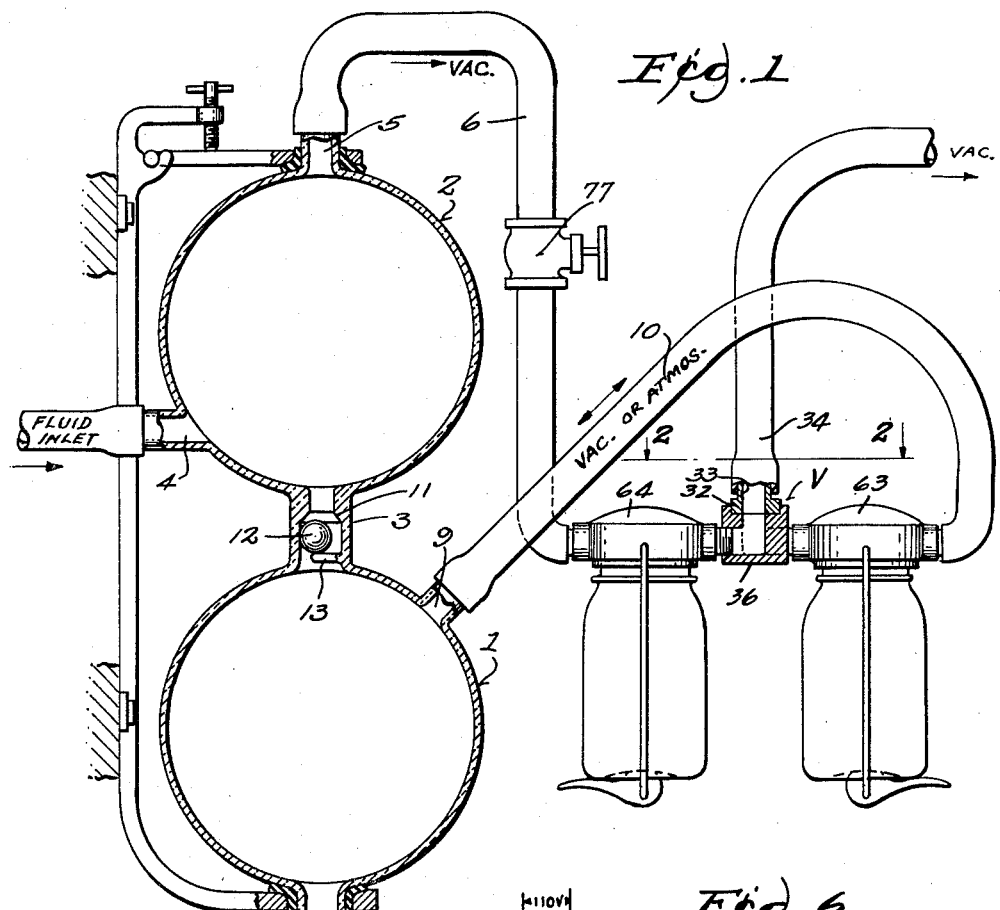
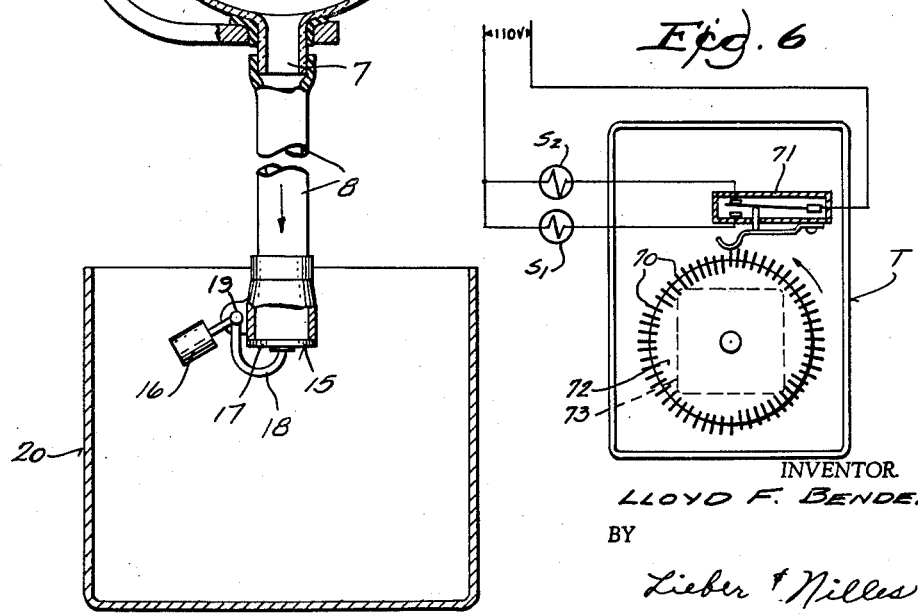
INVENTOR.
LLOYD F. BENDER
BY
Lieber & Nilles
ATTORNEYS June 29, 1965  L. F. BENDER  3,191,576
MILK LINE RELEASER AND WASHER APPARATUS
Filed Jan. 16, 1964  3 Sheets-Sheet 2
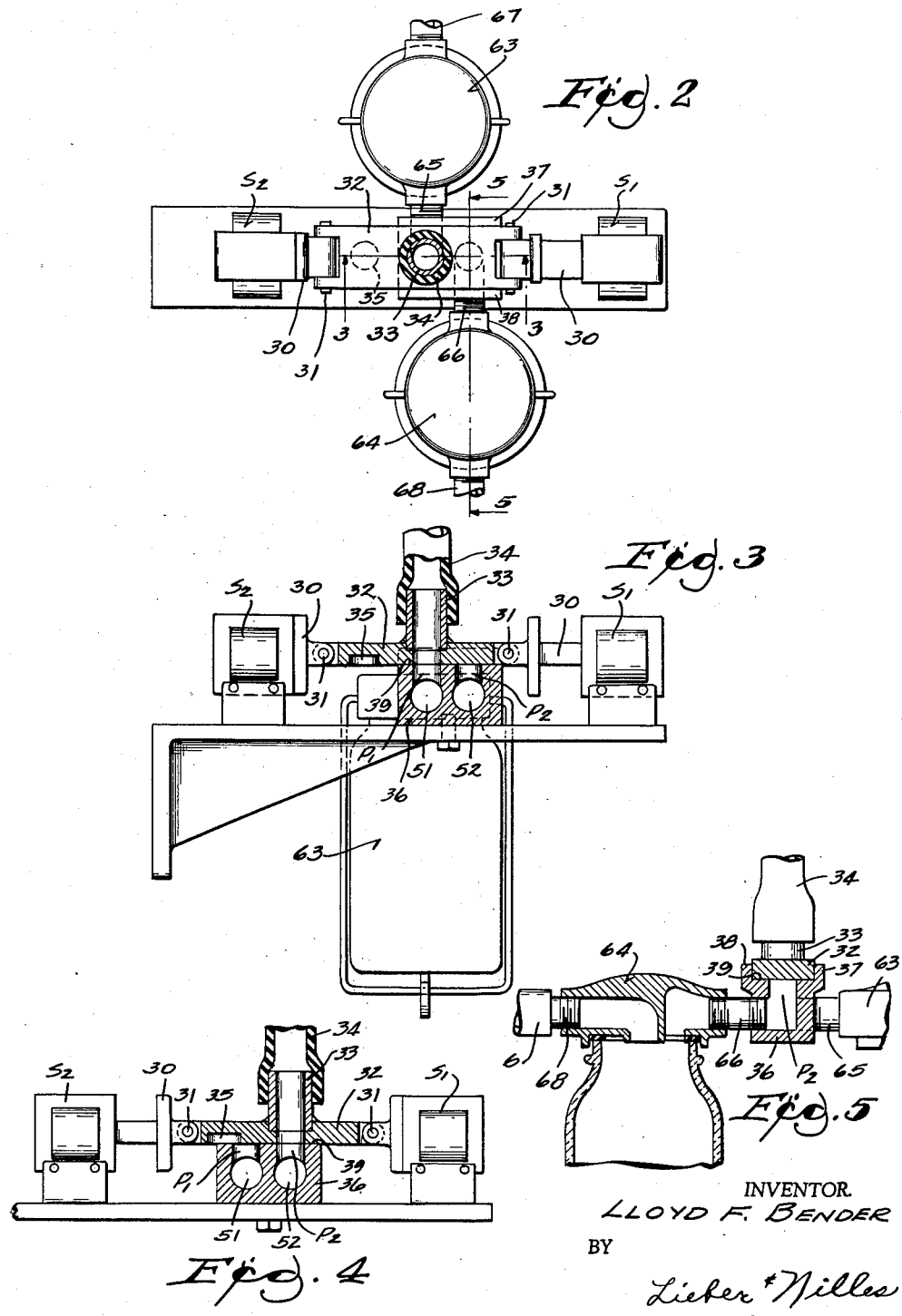
INVENTOR.
LLOYD F. BENDER
BY
Lieber & Nilles
ATTORNEYS

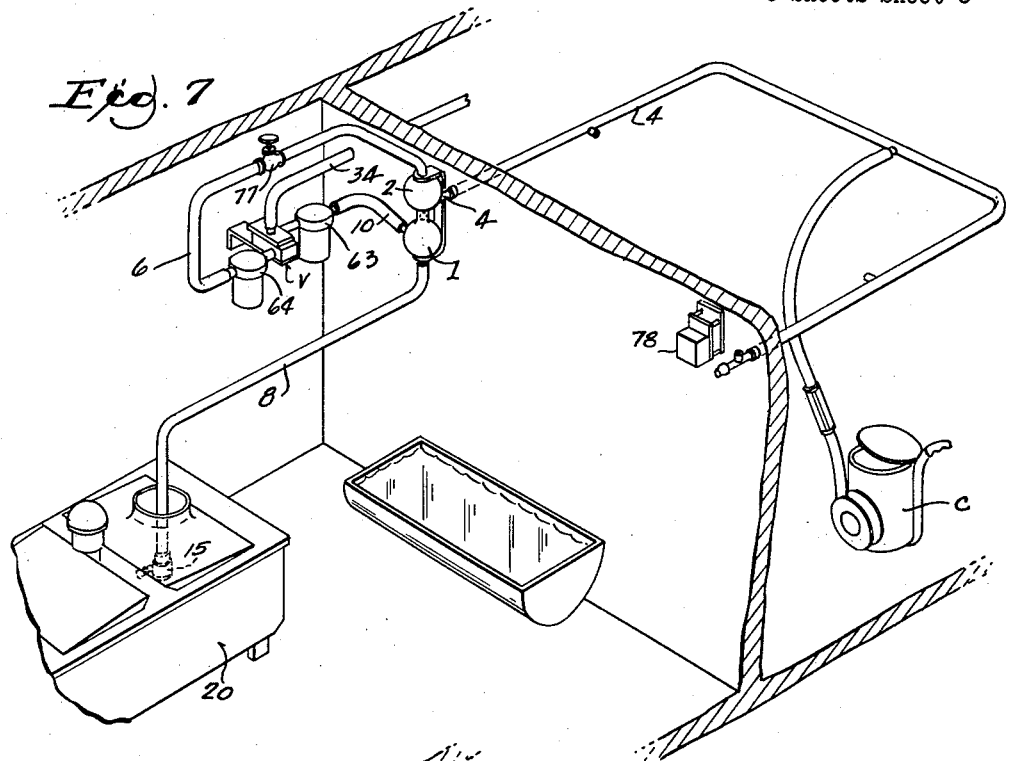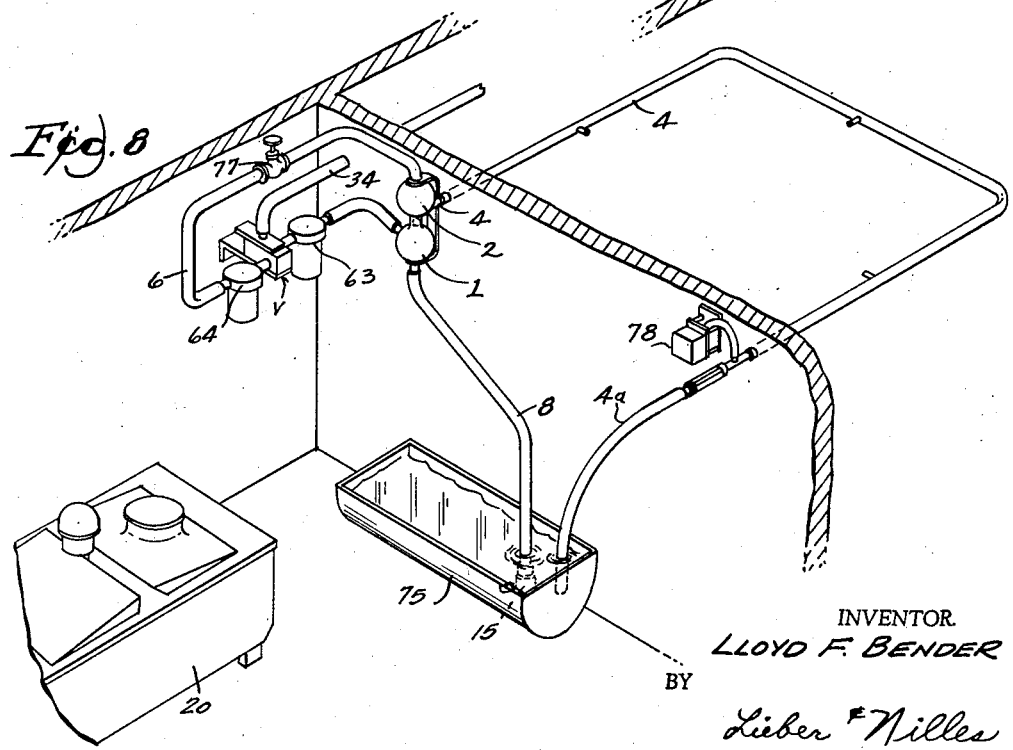

United States Patent Office 3,191,576
Patented June 29, 1965

3,191,576
MILK LINE RELEASER AND WASHER APPARATUS
Lloyd F. Bender, Rte. 2, Hayward, Wis.
Filed Jan. 16, 1964, Ser. No. 338,144
2 Claims. (Cl. 119—14.07)

This invention relates to dairy equipment or the like by means of which fluid is conducted through a pipe line system to a central location at which it is discharged into a bulk tank by a releaser.

Apparatus of this type is used to convey milk from the various milking stations in a barn to storage tanks or coolers located remotely from the milking stations. After the milking operation is completed, this apparatus and the milk lines must be thoroughly cleaned with a cleansing and sterilizing solution.

One type of prior art apparatus for moving the liquid in systems of this character involves vacuum actuated and float controlled pulsating pumps, such as shown in my United States Patent 3,052,190 issued September 4, 1962, and act to cause a pulsating pumping action in the fluid lines. Another example of the prior art apparatus of this general type is shown in the United States Patent 3,111,112 issued November 19, 1963, wherein a vacuum is always applied to the milk lines, but in a varying amount.

One of the shortcomings of the prior art of the latter type is that the full amount of vacuum is not always available to the lines, in fact, only a small percentage of the vacuum is available to continue to draw milk during certain phases of the entire operation.

Still another type of prior art is shown in United States Patent No. 1,562,770, issued November 24, 1925, wherein a pulsator works in combination with a milk releaser of the two-chambered type.

According to the present invention, automatically operated releaser apparatus is provided for moving fluid under a constant and continuous vacuum at all times even during the periodic fluid dumping operation. More specifically, this apparatus has two separate vessels connected together by a one-way check valve; one of these vessels which contains the fluid inlet is always subjected to vacuum, either directly from the vacuum source or through the other vessel; the other vessel is alternatively subjected to vacuum so as to furnish vacuum to the said one vessel, and to atmospheric pressure during which time it receives the fluid from the one vessel (which is then subjected to vacuum directly from the vacuum source) and dumps the fluid to a storage tank; valve means are provided for alternately subjecting said vessels to vacuum, and an adjustable timer is provided for operating the valve automatically without attention on the part of an operator. Thus the one vessel has two vacuum inlets which are periodically and alternatively used, and which provides a constant and continuous vacuum on the fluid lines yet at the same time provides for periodic fluid release.

The above invention also permits complete cleaning of the apparatus in an efficient manner and by the use of alternate slugs of air and a cleaning solution, and without necessitating disassembly of the apparatus; it being necessary only to connect the end of the milk line to a tank of cleaning solution, and shift the fluid discharge line back to the tank of cleaning solution to thereby form a complete circuit for the solution, and block off the vacuum to one of the vessels.

These and other objects and advantages of the present invention will appear hereinafter as this disclosure progresses, reference being had to the accompanying drawings, in which:

FIGURE 1 is an elevational view of apparatus made in accordance with the present invention, certain parts being shown in section, broken away or removed for clarity in the drawings;

FIGURE 2 is a plan view taken generally along line 2—2 in FIGURE 1 but on an enlarged scale and with certain parts in section or broken away;

FIGURE 3 is a sectional view taken along line 3—3 in FIGURE 2;

FIGURE 4 is a fragmentary, sectional view of a portion of the valve shown in FIGURE 3, but when moved to a different position;

FIGURE 5 is a sectional view taken along line 5—5 in FIGURE 2;

FIGURE 6 is a schematic view of a timer used to actuate the solenoids of the valve;

FIGURE 7 is a schematic diagram of the present apparatus when use in conveying milk as shown in the above figures; and FIGURE 8 shows the apparatus when used to clean the entire system.

*Fluid conveying operation*

The general arrangement for a fluid conveying operation is shown in FIGURE 7. Generally, the present invention provides two separate vessels which are connected together by a one-way check valve. One of the vessels is located above the other and is always subjected to a vacuum so that fluid, such as milk, is constantly drawn into this vessel through a milk line 4 and from a tank C or any number of milking stations or the like. The vacuum is applied to this upper vessel alternatively through a separate conduit or through the lower vessel.

The lower vessel is alternately subjected to a vacuum and then to atmospheric pressure. When this lower vessel is subjected to a vacuum the valve between the vessels is open, the separate suction conduit to the upper vessel no longer applies a suction, but the suction to the upper vessel instead is applied through the lower vessel; under these circumstances the fluid is drawn into the upper vessel and then rapidly and directly into the lower vessel through the open valve between the vessels.

When the lower vessel is open to atmospheric pressure, the valve between the vessels is closed, the separate suction line to the upper vessel is effective to provide the vacuum for the upper vessel and fluid continues to be drawn into the upper vessel without interruption; the lower vessel at this time is automatically drained by gravity into a storage tank or the like.

The vessels may take different forms and may be secured in communication with one another in various ways, with a one-way valve therebetween. In the drawings about to be referred to, the vessels are shown for illustrative purposes, as being generally spherical, arranged one above the other and connected by a distinct neck portion. These vessels may, however, be arranged differently and be nested one within the other, and they may be made of various material, such as glass for example, which permits easy and complete inspection for sanitary reasons, service or the like.

Referring in greater detail to the drawings, an alternate vacuum and atmospheric vessel 1 and an upper, constant vacuum vessel 2 are connected together by means of a neck portion 3. Upper vessel 2 has a fluid inlet 4 and a suction opening 5 which is in communication with a flexible conduit 6. Vessel 1 has a fluid outlet 7 to which is attached a discharged conduit 8. Vessel 1 also has an opening 9 in its upper side and spaced a distance from the neck. Conduit 10 is attached to opening 9 for drawing a vacuum or placing vessel 1 under atmospheric pressure.

A one-way check valve is provided between the vessels and includes a valve seat 11, shiftable ball 12 and a stop pin 13.

Flexible discharge conduit 8 extending from the lower end of vessel 1 has a pivoted disc valve 15 located at its discharge end and is held shut by vacuum in vessel 1. When the vessel 1 is open to atmospheric pressure through conduit 10, the weight 16 is such that it permits the valve disc 17 to swing away from its sealing engagement with the end of conduit 8 if there is any fluid in the vessel 1. Weight 16 and disc 17 are both mounted on arm 18 which is pivotally mounted at 19 on the valve 15 proper. Weight 16 normally holds the valve shut, but when any fluid is in vessel 1 it dumps by gravity into a tank 20 whenever the vessel 1 is not subjected to suction.

When vacuum is being drawn through conduit 6 which extends from the upper side of vessel 2, the ball seals against seat 11 and communication between the vessels is blocked.

When the vessel 1 is subjected to a vacuum, by means to be described, the ball 12 is pulled away from its seat and abuts against pin 13, thereby opening the neck between the vessels.

The means for causing the lower vessel to alternatingly be subjected to vacuum and then to atmospheric pressure, and for causing the suction in the separate conduit 6 of the upper vessel to be periodically interrupted while the suction is furnished through the lower vessel, will now be described. Generally, it consists of a solenoid operated valve V which is attached between the source of vacuum and the conduits 6 and 10 which are in communication, respectively, with the upper and lower receptacles. An electric timer T is connected to the solenoids and can be set to operate the solenoids alternatively, in any desired time cycles.

The solenoid operated valve includes a pair of electric solenoids S1 and S2, each have a shiftable plunger 30 which are attached by pins 31 to opposite ends of a slide 32. A short tube 33 is fixed in the slide and extends therethrough; and flexible conduit 34 fits snugly over this tube and places the valve in communication with a source of vacuum (not shown). The slide also has a recess 35 formed in that side of the slide adjacent the block. The purpose of this recess is to open conduit 10 and consequently vessel 1 to atmospheric pressure when the slide is moved to subject vessel 2 to suction.

A valve block 36 is provided with two side guides 37 and 38 between which the slide reciprocates in sliding contact with the surface 39 of the block. Block 36 has two right angular passages P1 and P2 passing therethrough.

Tube 33 is adapted to be aligned with one P1 or P2, respectively, depending on the position of he slide 32.

The other ends 51 and 52 of passages P1 and P2 are in communication, respectively, with the flexible conduits 10 and 6 which lead, respectivley, to the lower and upper vessels 1 and 2.

Water traps 63 and 64 are interposed in conduits 10 and 6, respectively, by means of threaded nipples 65 and 66 which are engaged in the internally threaded ends 51 and 52 of the passages, and also by means of tubular extensions 67 and 68 over which the conduits 10 and 6 are slipped in tight-fitting engagement.

The timer T is of the one-minute repeater type which has a series of tabs 70, each representing one second, which tabs can be manually set so as to clear or abut against a micro-switch 71 as the wheel 72 on which they are mounted rotates. This timer incudes an electrically driven motor 73 which drives the wheel 72 in the known manner. With the timer set as shown, the tabs are arranged to provide a period of 20 seconds for the suction to be applied directly to vessel 2 through conduit 6 during which time the fluid in vessel 1 is discharged, and then 10 seconds for the suction to be applied to vessel 2 through vessel 1 and conduit 10.

When vessel 1 is subjected to atmospheric pressure through the recess 35 of the valve V, the fluid then in vessel 1 will open the valve 15 and drain therefrom by gravity into the storage tank 20.

When vessel 1 is subjected to a vacuum via conduit 10, valve 15 is held shut, check ball 12 is held in the open position, and fluid is rapidly and directly sucked from inlet conduit 4 and into vessel 1.

The vessel 2 is always subject to a vacuum, either through conduit 6 or via vessel 1, depending on the position of the valve V as determined by the timer. When the valve is shifted to the FIGURE 4 position, the apparatus is set to suck fluid for 20 seconds, by vacuum in conduit 6. This shuts ball valve 12 and causes vessel 2 to fill a certain amount. During this time vessel 1 is subjected to atmospheric pressure via recess 35 in valve V and vessel 1 drains by gravity.

Then the timer shifts valve V to the FIGURE 3 position which causes suction to be applied via conduit 10 to vessel 1, and conduit 6 is sealed shut as shown in FIGURE 3. This causes valve 15 to be sucked shut and ball 12 held in the open position. The fluid then is immediately sucked directly from inlet conduit 4 and into vessel 1. I have found that due to the position of opening 9 in the upper side of the vessel 1 and yet spaced a distance from neck 3, there is no tendency for the fluid to enter or be sucked into conduit 10.

In any situation, the full vacuum is effective at all times on the line 4; there is no fluctuation of vacuum to retard the movement of the fluid and the system is caused to automatically operate by the solenoid and timer operated valve.

*Washing operation*

FIGURE 8 is a diagram of the system when being washed and purged with a cleaning solution. In order to clean the system it is unnecessary to disassemble any of the components.

A tank 75 containing a cleaning solution is provided in the milk room and conduit 8 is swung so valve 15 is located in the tank 75.

A shut-off valve 77 is provided in conduit 6, which valve is closed only during the washing operation.

During the washing operation the timer operates in the normal manner to subject vessel 1 alternately to vacuum and atmosphere. Cleaning fluid is drawn for a time from tank 75, through a detachable extension 4a of the line 4 and into vessel 2 where it splashes around cleaning vessel 2, and then enters vessel 1 due to vacuum in line 10, thereby cleaning vessel 1.

As shown in FIGURE 8, an electrically actauted timer and rotary valve 78 is connected in the end of line 4 and adjacent that end of line 4 which is in the tank 75. This timer-valve is adopted to intermittently admit successive slugs of cleaning solution separated by atmospheric air-filled spaces into pipe line 4 whenever vessel 1 is subjected to vacuum, to thereby facilitate the cleansing action. This timer of itself is not novel, and if a more complete description of it is deemed to be necessary or desirable, reference may be had to my United States Patent No. 3,119,399 which issues on January 28, 1964 and is entitled "Apparatus for Washing Milk Conducting Lines."

*General*

With the above arrangement an automatically operable fluid conducting apparatus is provided which provides a constant and continuous vacuum on the fluid lines for continuous movement of the fluid, and also provides for periodic fluid release; the same apparatus can be used for intermittent and complete and thorough cleaning of the entire system without disassembly thereof.

Various modes of carrying out the invention are contemplated as being within the scope of the following claims particularly pointing out and distinctly claiming the subject matter which is regarded as the invention.

I claim:

1. A milk line releaser and washer apparatus comprising a first fluid receiving generally spherical vessel having a fluid inlet and a vacuum inlet, a second generally spherical vessel, a narrow neck portion forming a fluid communicating connection between said vessels, a one-way check valve in said connection which closes and prevents fluid flow from said second vessel to said first vessel when the latter is subjected to vacuum via said vacuum inlet, said second vessel having a discharge opening at its lower side for draining fluid therefrom by gravity, a normally closed valve for said discharge opening and openable by the fluid in said second vessel when the latter is at atmospheric pressure, a conduit in communication with the upper side of said second vessel, and valve means in communication with a source of vacuum and communicable with said conduit and said vacuum inlet for alternately (1) subjecting said first vessel to vacuum and said second vessel to atmospheric pressure, and (2) subjecting said second vessel to vacuum and consequently said first vessel also to vacuum with said check valve, said valve means including a shiftable element to which said source of vacuum is connected by means of a flexible conduit, electrically operated means for actuating said valve, and timer means for initiating actuation of said electrically operated means.

2. Apparatus as defined in claim 1 including, a portable milk tank, a milk line for conducting milk from said tank to said fluid inlet in said first vessel whereby said releaser constantly applies vacuum to said tank to draw milk therefrom, a bulk tank for milk, and conduit means for connecting said bulk tank to said discharge opening in said second vessel.

References Cited by the Examiner
UNITED STATES PATENTS

| | | | |
|---|---|---|---|
| 1,452,600 | 4/23 | Hapgood | 119—14.28 |
| 1,562,770 | 11/25 | Jamieson | 119—14.07 |
| 2,895,450 | 7/59 | Hope | 119—14.05 |

SAMUEL KOREN, *Primary Examiner.*

HUGH R. CHAMBLEE, *Examiner.*